United States Patent
Davlos et al.

(10) Patent No.: US 11,762,629 B2
(45) Date of Patent: Sep. 19, 2023

(54) SYSTEM AND METHOD FOR PROVIDING A RESPONSE TO A USER QUERY USING A VISUAL ASSISTANT

(71) Applicant: JIO PLATFORMS LIMITED, Ahmedabad (IN)

(72) Inventors: Efstratios Davlos, Mumbai (IN); Sourja Banerjee, Navi Mumbai (IN); Jitendra Sahu, Navi Mumbai (IN); Mallikarjun S Bidari, Navi Mumbai (IN); Akshay Prakash Gaonkar, Mumbai (IN); Salman Shaikh, Navi Mumbai (IN); Rohan Khanna, Mumbai (IN); Satinder Pal Singh, Mumbai (IN); Vineet Garg, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/856,825

(22) Filed: Jul. 1, 2022

(65) Prior Publication Data

US 2022/0334795 A1 Oct. 20, 2022

Related U.S. Application Data

(62) Division of application No. 17/050,791, filed as application No. PCT/IB2019/052658 on Apr. 1, 2019, now Pat. No. 11,379,183.

(30) Foreign Application Priority Data

Apr. 26, 2018 (IN) .............................. 201821015878

(51) Int. Cl.
*G06F 3/16* (2006.01)
*G06F 16/435* (2019.01)
(Continued)

(52) U.S. Cl.
CPC ............ *G06F 3/167* (2013.01); *G06F 3/0481* (2013.01); *G06F 16/432* (2019.01);
(Continued)

(58) Field of Classification Search
CPC ...... G06F 3/167; G06F 3/0481; G06F 16/432; G06F 16/435; G06F 40/30; G06F 8/433;
(Continued)

(56) References Cited

U.S. PATENT DOCUMENTS 8,639,638 B2 1/2014 Shae et al.
11,379,183 B2 7/2022 Davios et al.
(Continued)

OTHER PUBLICATIONS

International Search Report and Written Opinion dated Jul. 17, 2019, from International Patent Application No. PCT/IB2019/052658, 10 pages.
(Continued)

*Primary Examiner* — Quoc A Tran
(74) *Attorney, Agent, or Firm* — Klarquist Sparkman, LLP

(57) ABSTRACT

Embodiments relate to providing at least one response to a user of a user device using a visual assistant, wherein the response is based on at least one user query. In an embodiment, the virtual assistant system receives the user query through a virtual multimedia contact, wherein the virtual multimedia contact is invoked by receiving a user command from the user through an interface. Thereafter, the virtual assistant system determines the response based on the user query. Further, the virtual assistant system selects a visual assistant (e.g., virtual character) for representing the response and subsequently provides the response to the user device using the visual assistant by transmitting the response to the user device using the visual assistant.

18 Claims, 7 Drawing Sheets

(51) Int. Cl.
  *G06F 16/432* (2019.01)
  *G06F 40/30* (2020.01)
  *G06F 3/0481* (2022.01)
  *G10L 15/18* (2013.01)
  *G10L 15/22* (2006.01)
  *G06F 16/955* (2019.01)
  *G06F 9/54* (2006.01)
  *G06F 16/00* (2019.01)
  *G06F 8/41* (2018.01)
  *G06F 16/9032* (2019.01)
  *G06F 17/00* (2019.01)

(52) U.S. Cl.
  CPC ............ *G06F 16/435* (2019.01); *G06F 40/30* (2020.01); *G10L 15/1815* (2013.01); *G10L 15/22* (2013.01); *G06F 8/433* (2013.01); *G06F 9/547* (2013.01); *G06F 16/00* (2019.01); *G06F 16/90332* (2019.01); *G06F 16/9566* (2019.01); *G10L 2015/223* (2013.01)

(58) Field of Classification Search
  CPC ...... G06F 9/547; G06F 16/00; G06F 16/9566; G06F 16/90332; G10L 15/1815; G10L 15/22; G10L 2015/223
  See application file for complete search history.

(56) References Cited

U.S. PATENT DOCUMENTS

| | | |
|---|---|---|
| 2014/0317502 A1 | 10/2014 | Brown et al. |
| 2015/0066479 A1 | 3/2015 | Pasupalak et al. |
| 2016/0071517 A1* | 3/2016 | Beaver .................... G06F 40/35 704/9 |
| 2019/0095775 A1* | 3/2019 | Lembersky ............ G06N 3/006 |
| 2021/0124555 A1 | 4/2021 | Davios et al. |

OTHER PUBLICATIONS

First Examination Report received in counterpart India Application No. 21821015878, dated Jul. 12, 2019, 6 pages.
Hearing Notice, received in counterpart India Application No. 21821015878, dated Oct. 23, 2019, 5 pages.

* cited by examiner

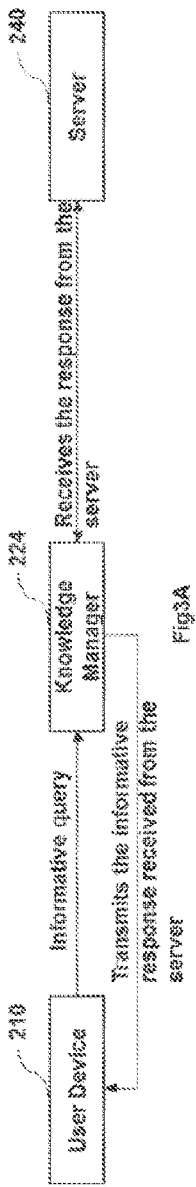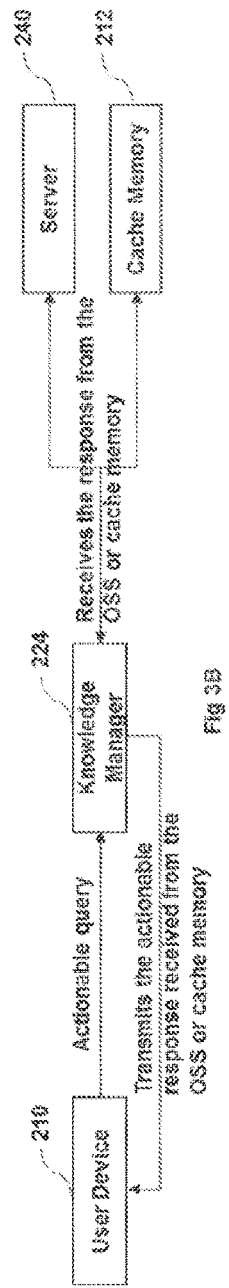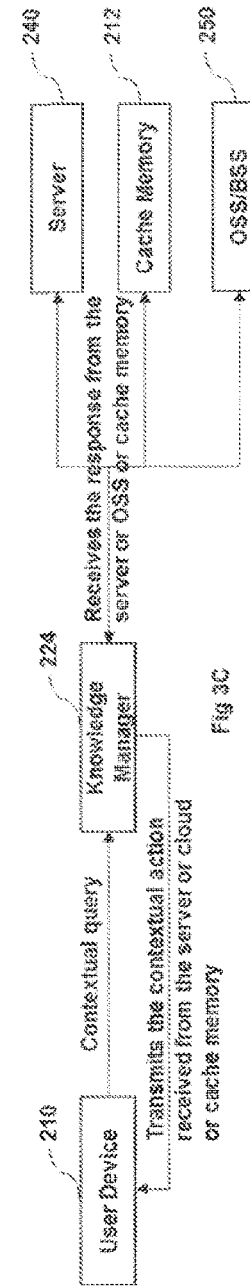

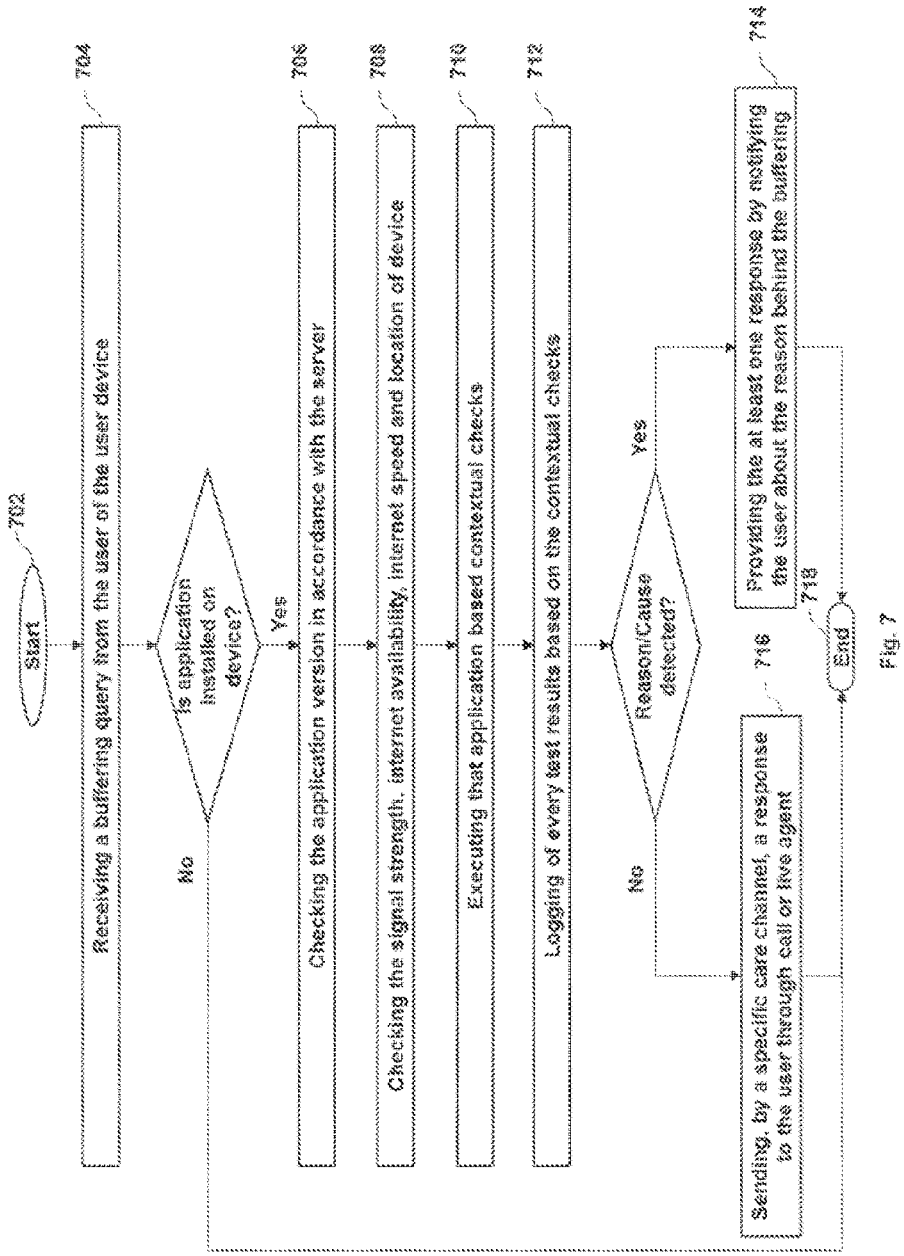

SYSTEM AND METHOD FOR PROVIDING A RESPONSE TO A USER QUERY USING A VISUAL ASSISTANT

CROSS REFERENCE TO RELATED APPLICATIONS

This is a Divisional of U.S. patent application Ser. No. 17/050,791, filed Oct. 26, 2020, which is the U.S. National Stage of International Application No. PCT/IB2019/052658, filed Apr. 1, 2019, which was published in English under PCT Article 21(2), which in turn claims the benefit of India Application No. 201821015878, filed in India on Apr. 26, 2018, all of which are hereby incorporated herein by reference.

FIELD

The present disclosure generally relates to wireless communications and more specifically, directed to a method and a system for processing at least one user query and accordingly providing at least one response to a user device using a visual assistant.

BACKGROUND

With the advancements in communications technology, in particular wireless technology such as licensed segment like GSM, EDGE, HSPA, LTE, etc. and unlicensed segment like Wi-Fi, UMA, DECT, Bluetooth, Zigbee, RFID, etc., wireless networks (deployed with multiple access networks) provide various communication services such as voice, video, data, advertisement, content, messaging and broadcasts. Recently, not only have such communication channels have grown exponentially, but heterogeneous networks have also been developed with more reliable protocols and better communications network and consumer hardware.

Alongside this, processing of computing devices has hugely improved over the years such that the consumers now have option(s) to select from multiple features such as voice calling, messaging, video calling, and many other value-added services initiated from native dialer applications. One of said multiple features in the smartphone device that has evolved is voice/video or any combination of multimedia call. The device has a user interface which typically includes a display with or without keypad including a set of alpha-numeric (ITU-T type) keys that may be real keys or virtual keys. The user interface also comprises touch/acoustic/video components for touch/sound/video input and output, a microphone, a speaker, camera and additionally audio/video I/O ports in an accessories interface, wherein the speaker normally serves to provide acoustic output in the form of human speech, ring signals, music, etc., and the camera serves to provide video input in the form of human images, tags, attributes, etc. and the display acts as an output for images, videos, VR images and videos, etc. Further, the voice calls and the video calls are considered as important and valuable tools of communications because of the voice identification, behavior, accent, emotion and ancillary information that a user may easily and efficiently communicate in said video/voice call and message. The input on the smart phones may be provided in terms of any short cut keys for making the desired command or through an intelligent integrated conversational interface (ICI). In addition to short keys available for initiating the calls, the users have an option to engage the integrated conversational interface (ICI) in a form of conversational dialog (example speech command). Said conversation interface can be implemented via existing third-party applications such as Google Voice application, Nuance application, Diction application, etc. Said voice enabled assistance feature can be implemented using various different platforms such as device APIs, the web, email, etc. to provide the speech command for dialing/messaging the contacts as stored in the personal contact list of the user device. Yet another feature available to the users includes a personal assistant (intelligent personal assistant (IPA) or virtual personal assistant (VPA)) that is considered as an intelligent evolution of services to meet the ever-increasing demands for mobility and connectivity. The IPA provides assistance to the users by answering questions in natural language, making recommendations, and performing actions/services based on user's inputs (including voice, vision (images), and contextual assistance). These applications are primarily based on two complementary technologies i.e. voice recognition and artificial intelligence. Therefore, the IPA enables the users to optimize the user resources (time, cost) and enhance overall productivity by minimizing interruptions in regular workflow.

However, existing/conventional technologies lack virtual multimedia contact in the user device that may be used to invoke a virtual multimedia bot to avail multiple services by the users. In particular, the conventional technologies fail to invoke a virtual multimedia contact through any interface or any input that may be one of (i) any special key (numbers, character, symbols or combination of any) in the native dialer; (ii) touch command; and (iii) intelligent conversational interface (ICI) voice command. Also, the conventional technologies facilitate only voice-based IPA and therefore, lack visual interactivity with the user in real time as well as user interaction with an avatar/personal assistant. Therefore, the conventional technologies restrict the user from experiencing a real time multimedia video call with a visual personal assistant bot system. Further, the conventional techniques face various other challenges while activating the IPA/VPA (through keys or interfaces). One of said challenges is meeting user's expectations in providing prompt and high-quality customer-in services, since said conventional techniques are dependent on customer executives who, without knowing the problems, attempt to solve the user's queries and concerns by manually looking into all the parameters, thereby resulting in delayed response. Another challenge lies in user experience management (UEM) that has become a fundamental tool for network operators, especially for mobile network operators. Yet another challenge lies in prioritizing the customer's issues and concerns, and consequently provide an optimized solution. Therefore, the conventional techniques are incapable of providing virtual multimedia contact bot and a unique bot invocation method i.e. the conventional techniques are incapable to facilitate user interaction with the avatar/personal assistant. As a result, the conventional techniques fail to provide solutions to user's queries through a video response (via personal assistance/avatar).

Accordingly, in order to overcome the aforementioned problems inherent in the existing solutions for resolving the user's queries and providing real time user interaction, there exists a need of a method for catering the user's queries and provide an adequate response to said queries through a video i.e., by facilitating a visual assistant to interact with the user and provide the response in a real time manner.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for providing at least one response to a user device, wherein the at least one response is based on at least one user query and the method being performed by a virtual multimedia system. The method comprising: receiving the at least one user query through a virtual multimedia contact, wherein the at least one user query is received from a user of the user device, the at least one user query is one of a text query, an audio query and a video query; the at least one user query invokes the virtual multimedia system, and the virtual multimedia contact is invoked by receiving a user command from the user through an interface; determining the at least one response for the at least one user query, wherein the at least one response comprises at least one of a contextual response, an informative response, a generic response and an actionable response; selecting a visual assistant for representing the at least one response, wherein the visual assistant is a virtual character configured to represent the at least one response, the visual assistant is selected based on a unique identifier of one of the user and the user device, and the visual assistant is selected in one of a real time manner and a pre-defined manner; and providing the at least one response to the user of the user device using the visual assistant, wherein the at least one response is provided in a real time manner, and the at least one response is based on the at least one query.

Further, the embodiments of the present disclosure encompass a virtual multimedia system for providing at least one response to a user device, wherein the at least one response is based on at least one user query. The virtual multimedia system comprising: a communication unit configured to receive the at least one user query through a virtual multimedia contact, wherein the at least one user query is received from a user of the user device, the at least one user query is one of a text query, an audio query and a video query; the at least one user query invokes the virtual multimedia bot system, and the virtual multimedia contact is invoked by receiving a user command from the user through an interface; a knowledge manager configured to: determine the at least one response for the at least one user query, wherein the at least one response comprises at least one of a contextual response, an informative response, a generic response and an actionable response selecting a visual assistant for representing the at least one response, wherein the visual assistant is a virtual character configured to represent the at least one response, the visual assistant is selected based on a unique identifier of one of the user and the user device, and the visual assistant is selected in one of a real time manner and a pre-defined manner, the communication unit is further configured to provide the at least one response to the user device using the visual assistant, wherein the at least one response is based on the at least one query.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

FIG. 5 illustrates an exemplary embodiment of the present disclosure that encompasses a contextual system architecture [500] for providing the at least one response to the at least one user query in an event the at least one response is a contextual response based on the contextual query.

FIG. 7 illustrates an exemplary embodiment of the present disclosure that encompasses a method [700] for providing the at least one response to the at least one user query, wherein the at least one user query relates to buffering issue.

DETAILED DESCRIPTION

Figure 1:
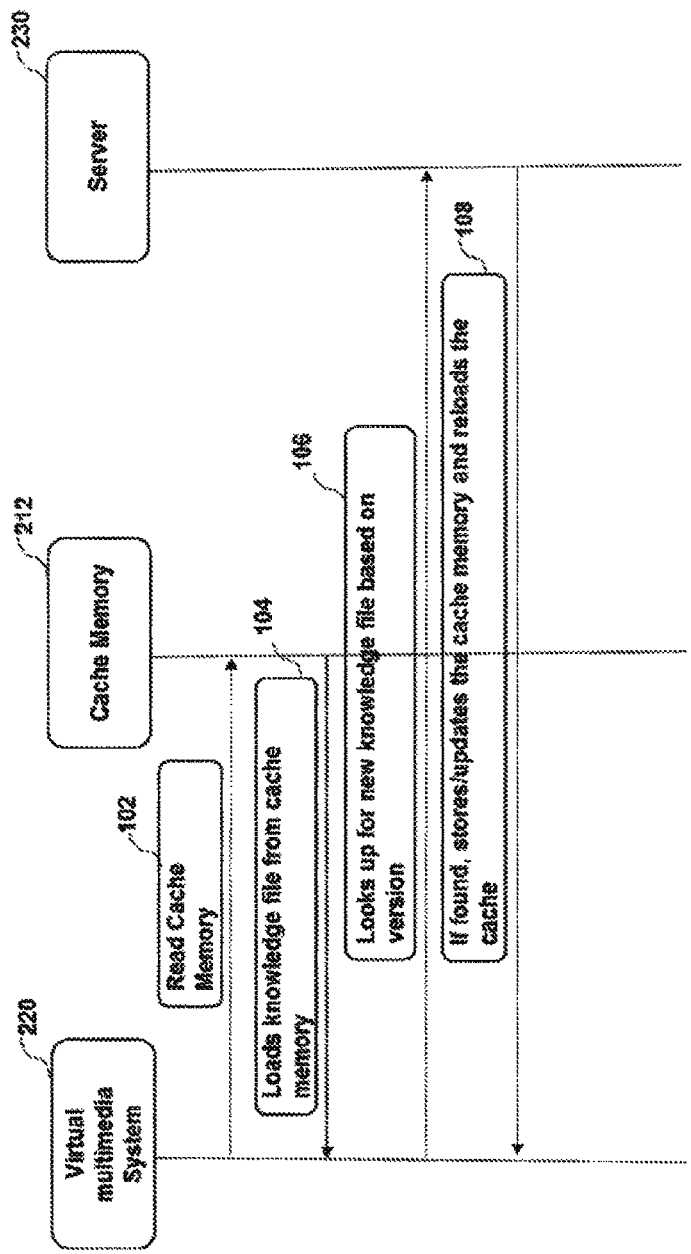
FIG. 1 illustrates an exemplary embodiment of the present disclosure that encompasses a signaling flow diagram [100] illustrating a pre-requisite process relating to pre-configuring a cache memory located at a user device.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to an intelligent virtual multimedia system and method for providing at least one response to at least one user query using a visual assistant. As a prerequisite for enabling the virtual multimedia system to determine the at least one response to the at least one user query and related information thereof, a storage unit of the virtual multimedia system may be configured to pre-configure a cache memory, located at the user device, with at least one of the tag, the at least one response, the visual assistant and any such information as may be obvious to person skilled in the art. FIG. 1 illustrates a signaling flow diagram [100] for pre-configuring the cache memory [212] located at the user device. The following steps describe the pre-requisites of pre-configuring the cache memory [212] of the user device:

At step 102, the virtual multimedia system [220], for providing the at least one response, may be initially configured to read the cache memory [212] and check/search for a knowledge file comprising at least one of the tag, the visual assistant, the intent of the at least one query, the at least one response and any such information as may be obvious to person skilled in the art.

At step 104, the virtual multimedia system [220] may be configured to load/save said knowledge file at the virtual multimedia system [220].

At step 106, the virtual multimedia system [220] may be configured to search if there is any new knowledge file based on a new version or any update available.

At step 108, the virtual multimedia system [220] may be configured to save the new/updated knowledge file in the virtual multimedia system [220].

Further, when a user using the user device experiences an issue/problem and seeks any response to a user query/concern or wishes to avail any service therein for resolving the issue, the user may communicate with the virtual multimedia system [220] directly without being dependent on a respective customer care executive, thereby avoiding delay. The virtual multimedia system [220] may be invoked by said at least one user query. Therefore, in order to find the response/solution for the issue/problem, the user may send the at least one user query to the virtual multimedia system [220] through a virtual multimedia contact i.e. the user may invoke the virtual multimedia contact by transmitting a user command to the virtual multimedia system [220] through an interface. In an embodiment, the interface is a user device interface, while in other embodiment, the interface is a native application interface. Thereafter, on receiving the at least one user query, the virtual multimedia system [220] may be configured to identify at least one intent and at least one tag to process the at least one tag and accordingly determine the at least one response. In an exemplary embodiment, the virtual multimedia system [220] may communicate with at least one of at least one server and an Operating Support System (OSS)/Business Support System (BSS) to determine the at least one response. Once the at least response is determined, the virtual multimedia system [220] may be configured to select the visual assistant which may be a virtual character configured to represent the at least one response, wherein the visual assistant is selected in one of a real time manner and a pre-defined manner. Subsequently, the virtual multimedia system [220] may be configured to provide the at least one response to the user of the user device by transmitting/exhibiting the at least one response to the interface using the visual assistant. Further, the present invention also encompasses updating of said cache memory [212] in every instance when the at least one response is provided to the user of the user device.

The virtual multimedia system [220] as used herein may be at least one of a chat bot, a video bot, a GIF bot, an audio bot, an advertisement bot, a meme bot, a virtual reality bot, a multi interface bot and an educational bot.

The user device as used herein may refer to any computing device including, but not limiting to, a mobile phone, a smart phone, a tablet, a wearable device, a phablet, and any such device as may be obvious to a person skilled in the art. The user device may have capability to communicate with the virtual multimedia system [220] and request for a solution/response to the user query without intervention of the customer care executives. Also, the user device may comprise the cache memory [212] for storing said knowledge file. Further, the user device may comprise an input means such as a keyboard, an operating system, a memory unit, an interface.

The interface as used herein may refer to any conversational dialog having capability to receive user's inputs/information and also, enable the visual assistant to represent the at least one response determined by the virtual multimedia system [220]. For e.g. a speech command using a natural language recognition system may be implemented using different platforms such as device APIs, the web, email and any such platform as may be obvious to person skilled in the art. Also, the interface may be implemented via already existing third party's applications readily available for integration in the system. More particularly, the interface may be a user device interface or a native application interface i.e. the interface may be either the device's interface or any residing application's interface. For e.g. the user device's interface may be the display screen of the user device that may be either touch sensitive or keys enabled, whereas the native application interface may be any application's interface. Furthermore, the interface may comprise one or more special keys i.e. dedicated keys configured to receive the user's inputs/commands.

The virtual multimedia contact may refer to any contact/phone number that may be invoked by the user command through the interface, wherein the user command is one of an audio command, a text command, a touch input, and a dedicated key (such as numbers, character, symbols or combination thereof) present in one of the user device interface and the native application interface. Further, the virtual multimedia contact may comprise at least one of an image, a meme, a name, a unique contact number and a text. Furthermore, the virtual multimedia contact may be integrated in at least one of a SIM of the user device, a memory of the user device, the cache memory [212] and the at least one server. Also, the virtual multimedia contact may be one of a pre-embedded in the SIM of the user device and installed in the user device from the at least one server [230]. In an embodiment, the virtual multimedia contact may refer to one of a Telecommunications Service Priority (TSP) preloaded SIM card, an application embedded in the user device provided by an Original Design Manufacturing (ODM)/Original Equipment Manufacturing (OEM); and a configuration setting pushed from the TSP.

The at least one server [230] as used herein may refer to a computer software/hardware capable of storing the virtual multimedia contact, contact numbers and other information, and simultaneously sharing the stored information with the client/users whenever required, wherein said information may also include, but not limited to, the tag, the at least one response. Also, said at least one server [230] may include, but not limited to a machine learning server, a data repository, a cloud host server and any such server as may be obvious to person skilled in the art.

The OSS/BSS as used herein may refer to a set of programs and instructions required by a communication service provider in monitoring, controlling, analysing and managing a computer network. Thus, the OSS and BSS when operated together support a range of telecommunication services.

The at least one user query as used herein may relate to any issue/problem faced by the user using the user device. The at least one user query may also relate to at least one service required by the user of the user device, wherein said at least one service comprises at least one of a troubleshooting, a diagnosis, a do-not-disturb, an entertainment, a buffering, a healthcare, an education related service and any such service as may be obvious to person skilled in the art. Further, the at least one user query may be received from the user using the user device through the virtual multimedia contact, wherein said at least one user query may be one of a text query, an audio query and a video query. For instance, the at least one query may be received by the virtual multimedia system [220] via at least one of a messaging communication and a video communication. The virtual multimedia system [220] may be configured to exhibit the at least one response using the visual assistant irrespective of the nature of the at least one user query (i.e. text, audio, video).

The at least one intent as used herein may refer to an intention or purpose of the user that may be derived/ identified from the at least one user query received from the user using the user device. In order to enter the at least one user query, the user may invoke/dial the virtual multimedia contact to ask/enter the query i.e. for e.g. "What is my data balance?" by transmitting the user command. The intent identified from said query is "data balance" i.e. the intent will be that the user wishes to know the balance of a subscribed plan used by the user.

The at least one tag as used herein may be a category that may be one of pre-defined or real time created by the cellular operator, wherein the category may be defined for determining the problem area/field where the user is facing the issue(s). In an event where the tag may be the pre-defined tag, the tag may include, but not limited to, network, billing, data service, voice service, general issues, device issues, location detection/services and existing connections with the user device. In another event where the tag may be real time created by the virtual multimedia system [220] based on the at least one user query. For instance, when the intent is identified as "balance", the virtual multimedia system [220] may determine the corresponding tag as "billing". In an embodiment, there may be common/single tag for multiple number of the intents derived from the at least one user query.

The at least one response as used herein may refer to a solution to the at least one user query. The at least one response may be provided to the user by exhibiting the at least one response to the user using the visual assistant. The at least one response, based on the at least one user query, may comprise at least one of a contextual response, an informative response, a generic response, an actionable response and any such response as may be obvious to person skilled in the art based on the at least one user query. Furthermore, the at least one response may be one of a pre-existing response and a real time created response i.e. in an event the cache memory and the at least one server do not contain the response for a specific tag/user query, the virtual multimedia system [220] may be configured to create the real time response for that particular user query.

The visual assistant as used herein may refer to a virtual character configured to represent the at least one response to the user of the user device. Further, the terms 'visual assistant' and 'virtual character' may be interchangeably used throughout the disclosure.

Figure 2:
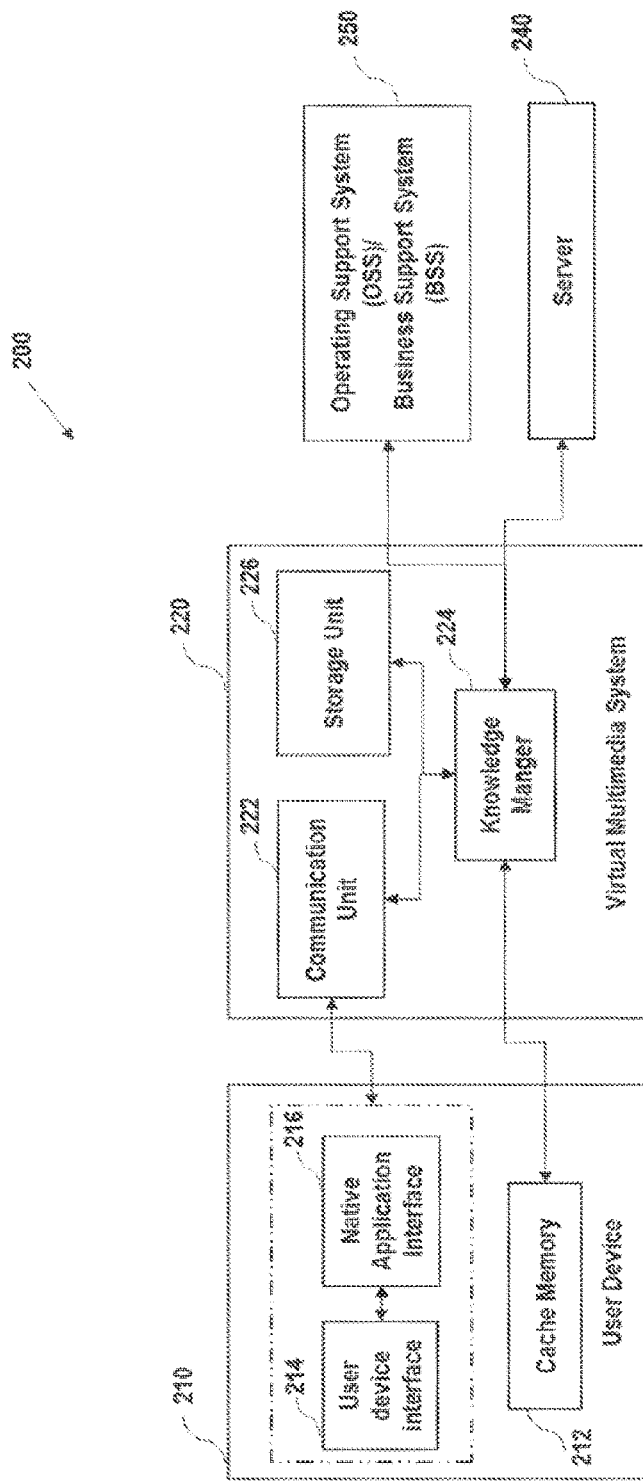
FIG. 2 illustrates an exemplary system architecture [200] for virtual multimedia system for providing at least one response to a user device based at least one user query in accordance with an embodiment of the present disclosure.

FIG. 2 illustrate a system architecture [200] for providing the at least one response to the user of the user device in accordance with embodiments of the present disclosure. As illustrated, the system architecture [200] may comprise a user device [210], a virtual multimedia system [220], at least one server [240] and an Operating Support System (OSS)/ Business Support System (BSS) [250]. Further, the user device [210], the virtual multimedia system [220], the at least one server [240], the OSS/BSS [250] and the sub-components therein may be configured to work in conjunction and provide respective functionalities in order to achieve the objective of the present disclosure.

The user device [210] may comprise the cache memory [212] and the interface (user device interface [214] and the native application interface [216]). Further, the virtual multimedia system [200] may comprise a communication unit [222], a knowledge manager [224] and a storage unit [226], wherein the communication unit [222], the knowledge manager [224] and the storage unit [226] may be internally connected to each other for facilitating internal communication in accordance with the present disclosure.

In an event the user faces an issue while using the user device [210] or the user may wish to avail any service, the user may invoke/dial the virtual multimedia contact by transmitting the user command (audio command, video command, text command, touch input, dedicated key) through the interface [214, 216] to further transmit the at least one user query to the communication unit [222] of the virtual multimedia system [220]. In an embodiment, the user may enter the at least one user query by typing or sending a message or by speaking/sending a voice message/speech command. In another embodiment, the user may dial/invoke the virtual multimedia contact and initiate a video call with the virtual multimedia system [220], wherein the user may communicate with the visual assistant of the virtual multimedia system [220] during the video call and may ask the at the least one user query. Further, in one embodiment, the virtual multimedia contact may be stored in at least one of the SIM of the user device [210], the memory of the user device [210], the cache memory [212] and the at least one server [240], while in another embodiment, the virtual multimedia contact may be either pre-embedded in the SIM or installed in the user device [210] from the at least one server [240].

Further, on receiving the at least one user query from the user device [210] by the communication unit [222] of the virtual multimedia system [220], the virtual multimedia system [220] may be invoked. Subsequently, the knowledge manager [224] of the virtual multimedia system [220] may be configured to determine the at least one response for the at least one user query. In order to determine the at least one response, the knowledge manager [224] may be configured to identify the at least one intent from the at least one user query that may specify the intention or purpose of the user. In an embodiment, the knowledge manager [224] may be configured to identify the at least one intent from one of the at least one server [240] and the cache memory [212], wherein the at least one server [240] may be a machine learning server. In an embodiment where the at least one user query is a text query, the knowledge manager [224] may be configured to identify the at least one intent from the text query using one or more machine learning techniques including, but not limiting to, a neural network, a maxentropy, a tensor network, a topic based model (LDA/SLDA), libraries and services. Pursuant to the identification of the at least one intent, the knowledge manager [224] may be configured to determine the at least one tag corresponding to the at least one intent, wherein the at least one tag may refer to the category defined for determining the reason/area of problem where the user is facing issues. In an embodiment, the knowledge manager [224] may be configured to determine the at least one tag from one of the at least one server [240], the Operating Support System (OSS)/Business Support System (BSS) [250] and the cache memory [212], wherein the at least one server [240] may be a data repository comprising a plurality of video libraries. In one embodiment, the at least one tag may be pre-defined or created in real time manner. Once the at least one tag is determined for each of the at least one intent, the knowledge manager [224] may be configured to process the at least one tag and determine at least one response, wherein the at least one response, based on the at least one user query, may comprise one of the contextual response, the informative response, the generic response, the actionable response and any such response as may be obvious to person skilled in the art. Said at least one response may be one of the pre-existing response and the real-time created response.

Pursuant to determining the at least one response, the knowledge manager [224] may be configured to select the visual assistant for representing the at least one response, wherein the visual assistant may be the virtual character configured to represent the at least one response. In an embodiment, the visual assistant may be selected based on the unique identifier of one of the user and the user device [210] in an event the visual assistant is selected in the pre-defined manner, while in another embodiment, the visual assistant is selected in the real time manner. The communication unit [222] may be then configured to provide the at least one response to the user of the user device [210] by transmitting the at least one response to the interface [214, 216] using the visual assistant i.e. the visual assistant may be configured to exhibit the at least one response to the user of the user device [210] on the interface [214, 216]. The present invention encompasses providing the at least one response to the user of the user device [210] in one of the Graphics Interchange Format (GIF) and a video mode. In an embodiment, if the at least one user query is received via the user device interface [214], then the visual assistant may be exhibited on the user device interface [214], while in another embodiment, if the at least one user query is received via the native application interface [216] residing in the user device [210], then the visual assistant may be exhibited on the native application interface [216].

Further, the storage unit [226] of the virtual multimedia system [220] may be configured to update the cache memory [212] of the user device [210] in an event the at least one response is provided to the at least one user device [210].

In an exemplary scenario, the user of the user device [210] invokes the virtual multimedia contact through the audio command i.e. by transmitting the speech/audio command to invoke/dial the virtual multimedia contact and subsequently transmits the at least one user query to the virtual multimedia system [220] by speaking i.e. the user speaks the at least one user query "What is the data balance of my user device". Now, on receiving the at least one user query, the least one intent may be identified as "balance" by the virtual multimedia system [220]. Based on said intent, the tag determined may be "billing". Based on said tag, the at least one response may be determined as "Informative response" and the at least one response may be "100". Subsequently, the visual assistant (virtual character) may be selected in one of the pre-defined manner and the real time manner. For example, a specific virtual character may be selected for a specific user, then that particular virtual character may be selected again. Accordingly, the selected virtual character may be exhibited on the interface [214, 216], wherein said virtual character may be configured to provide/speak the at least one response to the user i.e. "data balance is 100" to the user. The present invention encompasses providing the at least one response to the user of the user device [210] in one of the Graphics Interchange Format (GIF) and the video mode.

In another exemplary scenario, the at least one user query received from the at least one user device [210] is the text query and is "I don't want to be disturbed by any call/message and therefore, want to activate the do-not-disturb service". The intent identified from said query may be "do-not-disturb". Based on said intent, the tags determined by the virtual assistant system [220] may be "Network" and "Data Service" and "Voice Service". Based on said tags, the response determined may be "Actionable response" which may comprise requesting the cellular operator to activate the do-not-disturb service on the user device [210]. The visual character may be then selected and may be configured to speak/provide the execution of the at least one response (i.e. service) to the user of the user device [210]. Thus, in an event the do-not-disturb service is activated, the visual character may be configured to communicate to the user that "Your do-not-disturb service is activated", while in another event if the do-not-disturb service is not activated, the visual character may be configured to communicate to the user that "Your do-not-disturb service is not activated".

In another exemplary scenario, the at least one user query received from the at least one user device [210] is the voice query and is "Please locate me to the nearest hospital". The intent identified from said query may be "nearest hospital". Based on said intent, the tag determined by the virtual assistant system [220] may be "Location detection/services". Based on said tag, the response determined may be "Actionable response" which may comprise requesting the cellular operator to locate the hospital nearest to the user of the user device [210]. The visual character may be then selected and may be configured to provide the execution of the at least one response (i.e. service) to the user of the user device [210]. Thus, the visual character may be configured to communicate to the user and inform the user that "the nearest hospital is abc". Thus, the present invention encompasses providing responses (or execution of responses/services) to the user's query in various fields and domains including, but not limiting to, troubleshooting, a diagnosis, a do-not-disturb, an entertainment, a buffering, advertisement, a healthcare and an education related service.

Figure 3:
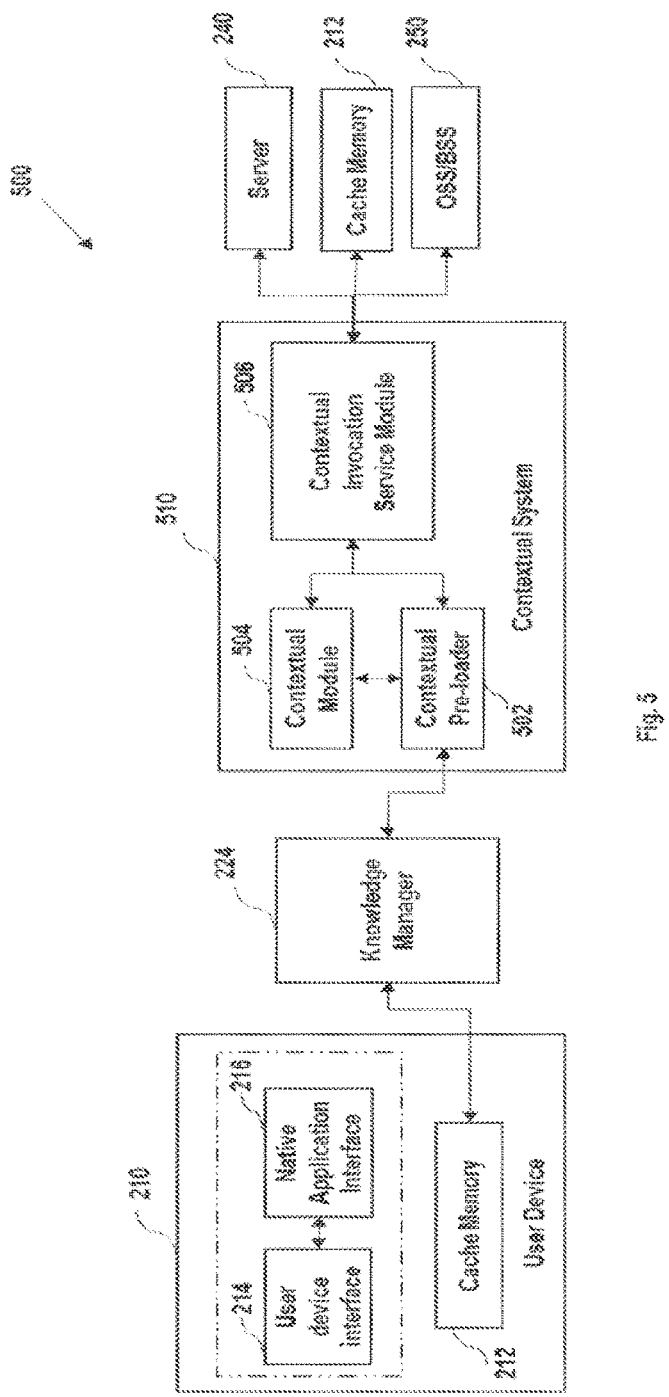
FIG. 3A, FIG. 3B and FIG. 3C illustrate exemplary use cases for providing responses for multiple exemplary user queries in accordance with the embodiments of the present disclosure.

Further, FIG. 3A, FIG. 3B and FIG. 3C illustrate exemplary use cases for providing responses for multiple exemplary user queries in accordance with the embodiments of the present disclosure. In Use Case 1 (FIG. 3A) where the at least one response may be determined as the informative response by the knowledge manager [224] based on the informative query, the communication unit [222] may be configured to communicate the at least one response to the user on the user device [210] i.e. providing the required information to the user using the interface [224, 226]. In Use Case 2 (FIG. 3B) where the at least one response may be determined as the actionable response by the knowledge manager [224] based on the actionable query, the knowledge manager [224] may be configured to perform the requisite action/service (executing a specific action for e.g. connecting the user with the network operator) pursuant to communication with at least one of the at least one server [240] and the cache memory [212] and subsequently, the communication unit [222] may be configured to communicate/notify the user about the execution of the requisite action/service by the knowledge manager [224]. Further, Use Case 3 (FIG. 3C) illustrates an exemplary scenario where the at least one response may be determined as the Contextual response by the knowledge manager [226] based on the contextual query, wherein the contextual response may be determined in two exemplary scenarios. In first exemplary scenario where the at least one user query is "please play video of xyz song", the knowledge manager [224] may first check if the strength of the mobile tower located in the vicinity of the user device [210] is sufficient for playing the video song. In an event the strength of the mobile tower is not sufficient, the visual assistant may be configured to communicate with the user and inform that the "the video song cannot be played due to weak signal strength". In second exemplary scenario where the at least one user query is "what is the balance", the knowledge manager [224], using the visual assistant, may ask the user the specific type of service for which the balance is required for e.g. data balance, voice balance, etc. On receiving the instructions from the user, the knowledge manager [224] may process the information and may communicate with at least one of the at least one server [240], the OSS/BSS [250] and the cache memory [212]. Accordingly, the communication unit [222] may communicate with the user and inform the user that "your balance is 2 GB" using the visual assistant.

Figure 4:
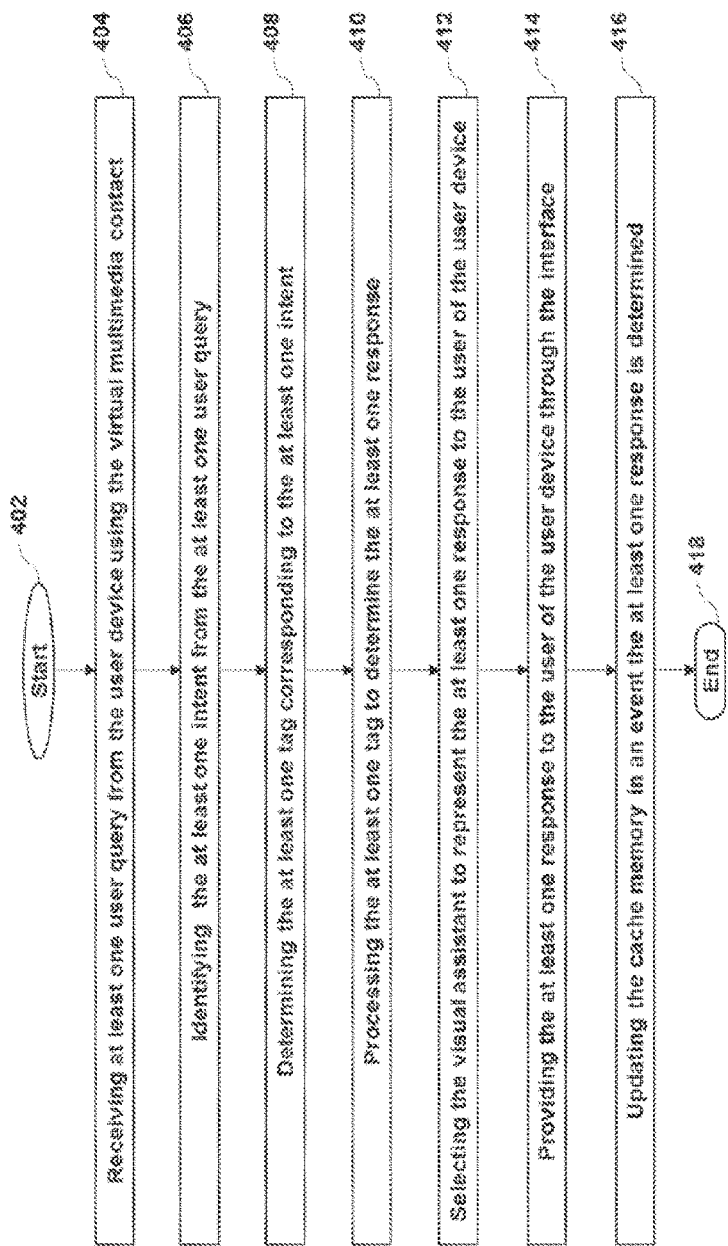
FIG. 4 illustrates an exemplary method flow diagram [400] comprising the method for providing the at least one response to the user device based on the at least one user query in accordance with an embodiment of the present disclosure.

FIG. 4 illustrates an exemplary method flow diagram [400] comprising the method for providing the at least one response to the user device based on the at least one user query in accordance with an embodiment of the present disclosure. The method [400] may initiate at step 402 where the storage unit [226] of the virtual multimedia system [220] may pre-configure the cache memory [212] with at least one of the at least one intent, the at least one tag, the at least one response, the visual assistant, and any such information as may be obvious to person skilled in the art.

At step 404, the communication unit [222] of the virtual multimedia system [220] may receive the at least one user query in an event the user invokes/dials the virtual multimedia contact, wherein the virtual multimedia contact may be invoked by the user command through the interface, and the user command may be one of the audio command, the text command, the touch input, and the dedicated key (such as numbers, character, symbols or combination thereof) present in one of the user device interface [214] and the native application interface [216]. Thus, the at least one user query may be transmitted by the user to the communication unit [222] of the virtual multimedia system [220] by typing a message through the messaging communication/session or speaking/sending an audio message or a speech command through the video communication. For example, the at least one user query is "Please upgrade my 3G plan to 4G plan". The communication unit [222] may internally communicate the at least one query to the knowledge manager [224] of the virtual assistant system [220].

At step 406, the knowledge manager [224] may identify the at least one intent from the at least one user query that may specify the intention or purpose of the user, wherein said at least one intent may be identified from one of the at least one server [240] and the cache memory [212]. Based on the exemplary user query received at step 404, the at least one intent may be identified as "upgrading data plan".

At step 408, the knowledge manager [224] may determine the at least one tag corresponding to the at least one intent, wherein the at least one tag may refer to the category defined for determining the reason/area of problem where the user is facing issues. Further, the at least one tag may be determined from one of the at least one server [230], the Operating Support System (OSS)/Business Support System (BSS) [240] and the cache memory [212], and the at least one tag may be one of the pre-defined tag and the real time created tag. Based on the exemplary at least one intent identified in previous step 406, the at least one tag may be determined as "data service".

At step 410, the knowledge manager [224] may process the at least one tag to determine at least one response, wherein the at least one response may comprise one of the contextual response, the informative response, the generic response, the actionable response based on the at least one user query. Said at least one response may be one of the pre-existing response and the real-time created response. Based on the exemplary at least one tag determined in previous step 408, the at least one response may be "plan upgraded to 4G" based on accomplishing the searches of finding nearest coffee shops.

At step 412, once the at least one response is determined, the knowledge manager [224] may select the visual assistant for representing the at least one response to the user of the user device [210], wherein the visual assistant is the virtual character configured to represent the at least one response. In an embodiment, the visual assistant is selected in one of the real time manner and the pre-defined manner. Based on the exemplary the at least one response determined in previous steps 410, the visual assistant (virtual character) may be selected as a "celebrity character" to represent the at least one response. The visual assistant (virtual character) be the internally communicated to the communication unit [222] of the virtual multimedia system [220].

At step 414, the communication unit [222] may provide the at least one response to the user of the user device [210] by transmitting the at least one response to the interface [214, 216] using the visual assistant (virtual character) i.e. the virtual assistant may be configured to exhibit the at least one response to the user of the user device [210] on the interface [214, 216]. The present invention encompasses providing the at least one response to the user of the user device [210] in one of the Graphics Interchange Format (GIF) and the video mode. Based on the exemplary the at least one response and the visual assistant (Virtual character) determined/selected in previous steps 410 and 412, the celebrity character may be exhibited to the user on the interface [214, 216], wherein the celebrity character may speak the at least one response i.e. the "your data is upgraded to 4G".

At step 416, the storage unit [226] of the virtual multimedia system [220] may update the cache memory [212] of the user device [210] in an event the at least one response is provided to the at least one user device [210].

FIG. 5 illustrates an exemplary embodiment of the present disclosure that encompasses a contextual system architecture [500] for providing the at least one response to the at least one user query in an event the at least one response is the contextual response based on the contextual query. The contextual system architecture [400] may comprise the user device [210], a contextual system [510], the knowledge manager [224], the at least one server [240], the cache memory [212] and the Operating Support System (OSS)/ Business Support System (BSS) [250], wherein the user device [210], the contextual system [510], the knowledge manager [224], the at least one server [240], the cache memory [212], the Operating Support System (OSS)/Business Support System (BSS) [250] and the sub-components therein may be configured to work in conjunction and provide respective functionalities in order to achieve the objective of the present disclosure.

The contextual system [510] may comprise a contextual pre-loader [502], a contextual module [504] and a contextual invocation service module [506]. Further, in an event the knowledge manager [224] processes the at least one tag (based on the at least one intent of the at least one user query received from the user using the at least one user device

[210]) and determines the at least one response as the contextual response, the knowledge manager [224] may be configured to notify the contextual response to the contextual pre-loader [502] of the contextual system [510], thereby invoking the contextual system [510], wherein each of the at least one tag corresponds to a leaf node indicating the at least one response to the at least one user query. Thereafter, the contextual invocation service module [506] of the contextual system [510] may be configured to process each of the at least one leaf node and determines the at least one response/service till the adequate response/service is achieved/performed and the user is satisfied. For example, when the at least one response determined at the initial level is not convincing to the user, the contextual invocation service module [506] may be configured to further determine the next at least one response and the process may continue till the desired response to the user's query is determined and the user is satisfied. Also, the contextual module [504] may be configured to provide the at least one response to the user of the user device [210] using the visual assistant (virtual character) in one of the GIF and the video mode. Besides, the contextual module [504] may be configured to store the knowledge file comprising at least one of the tag, the at least one intent, the at least one response, the visual assistant any such information as may be obvious to a person skilled in the art.

Figure 6:
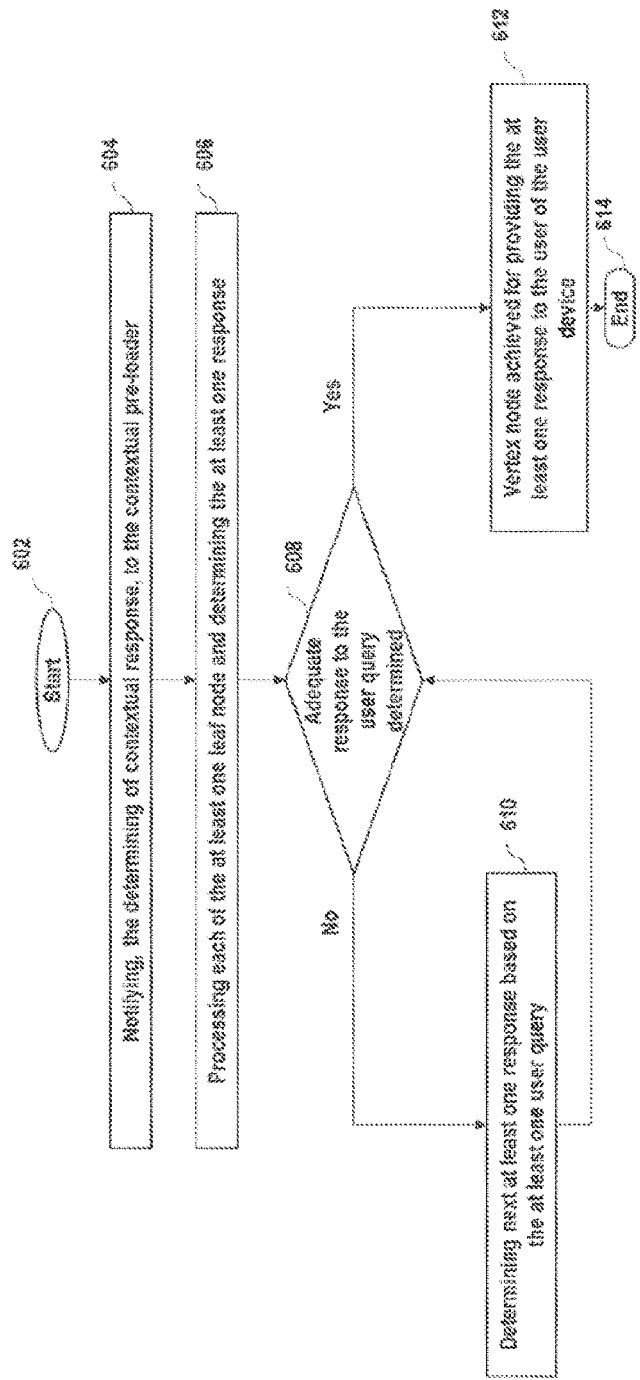
FIG. 6 illustrates an exemplary embodiment of the present disclosure that encompasses a method [600] for providing the at least one response to the at least one user query in an event the at least one response is a contextual response based on the contextual query.

FIG. 6 illustrates an exemplary embodiment of the present disclosure that encompasses a method [600] for providing the at least one response to the at least one user query in an event the at least one response is a contextual response based on the contextual query. The method [600] may initiate at step 602 where the knowledge manager [226] processes the at least one tag (based on the at least one intent of the at least one user query received from the user using the at least one user device [210]) and determines the at least one response as the contextual response.

At step 604, the knowledge manager [224] may notify the contextual response to the contextual pre-loader [502] of the contextual system [510], thereby invoking the contextual system [510]. Each of the at least one tag corresponds to the leaf node indicating the at least one response to the at least one user query. In particular, the leaf node may indicate at least one response determined at a first/initial level, while a vertex node may indicate that node where the desired response to the user's query is determined and the user is satisfied. In an embodiment, the leaf node may be the vertex node in an event the user is satisfied and the desired response is determined at the leaf node without any need of further processing.

At step 606, the contextual invocation service module [506] of the contextual system [510] may process each of the at least one leaf node and determines the at least one response/service till the adequate response/service is achieved/performed and the user is satisfied.

At step 608, the contextual invocation service module [506] may check whether or not the adequate/desired response to the at least one user query is determined. In an event the desired response is not achieved, the method [600] may lead to subsequent step 610. Alternatively, if the desired response is achieved and the user is satisfied, the method [600] may lead to step 612.

At step 610, when the at least one response determined at the initial level (leaf node) is not convincing to the user, the contextual invocation service module [506] may further determine next at least one response based on the at least one user query. The method [600] may then go back to step 608 i.e. the process of determining the at least one response may continue till the desired response to the user's query is determined and the user is satisfied.

At step 612, the vertex node is achieved in an event the desired response is determined. The method [600] may then terminate at step 614 with the completion of providing the at least one response to the user of the user device [210].

FIG. 7 illustrates an exemplary embodiment of the present disclosure that encompasses a method [700] for providing the at least one response to the at least one user query, wherein the at least one user query relates to buffering issue. The method [700] may initiate at step 702 where the user invokes the virtual multimedia contact to transmit the at least one query relating to the buffering issue with regard to any application/software installed in the user device [210].

At step 704, the communication unit [222] of the virtual multimedia system [220] may receive the at least one user query by the user of the user device [210], wherein the at least one user query ay relate to the buffering issue, and may comprise information of the application/software in which the user is facing the buffering issue. The knowledge manager [224] may check whether or not said application/software (where the buffering issue s faced) is installed at the user device [210]. In an event the application/software is installed at the user device [210], the method [700] may lead to step 706. Alternatively, the method [700] may terminate at step 718.

At step 706, the knowledge manager [224] may identify the application/software version with respect to the at least one server [240].

At step 708, the knowledge manager [224] may determine at least one of the signal strength, internet availability, internet speed and location of the user device [210].

At step 710, the knowledge manager [224] may execute at least one application/software based contextual check for detecting the reason/cause/issue of the buffering.

At step 712, the knowledge manager [224] may analyse and store each test result obtained from the at least one contextual check performed in the previous step 710. In an event the reason of the buffering is detected, the method [700] may lead to step 714. Alternatively, the method [700] may lead to step 716.

At step 714, the communication unit [222] may provide the at least one response to the user of the user device by transmitting the reason of the buffering to the user using the visual assistant (virtual character). The method [700] may then terminate at step 718.

At step 716 where the reason of the buffering is not detected, the communication unit [222] may send the at least one response to the user of the user device [210] via one of a voice call and an agent. In an embodiment, the response may be sent to the user through a specific care channel. In an embodiment, the agent is a live agent.

Therefore, the present disclosure encompasses a mechanism for providing the at least one response to the user of the user device by enabling the visual assistant to communicate with the user and transmit the at least one response to the user device through the interface [214, 216]. The present disclosure further encompasses providing the at least one response based on the at least one user query without any intervention of the customer care executives, thereby catering the user's problems/issues independently and enhancing the user experience. Also, the present disclosure encompasses remote access to users, thereby allowing distributed diagnosis and troubleshooting of in-service problems/issues of the users using the at least one user device [210].

Though a limited number of the user device [210], the virtual multimedia system [220], the at least one server

[240], the Operating Support System (OSS)/Business Support System (BSS) [250], the contextual system [510] and the subcomponents therein have been shown in the figures; however, it will be appreciated by those skilled in the art that the system [100] of the present disclosure encompasses any number and varied types of the components/modules and other components/sub systems as may be obvious to person skilled in the art.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:

1. A virtual multimedia system for providing a response to a user device, wherein the response is based on at least one user query, the virtual multimedia system comprising:
    a communication unit configured to receive the at least one user query through a virtual multimedia contact, wherein:
    the at least one user query is received from a user of the user device,
    the at least one user query comprises a text query, an audio query, or a video query;
    the at least one user query invokes the virtual multimedia system, and
    the virtual multimedia contact is invoked by receiving a user command from the user through an interface;
    a knowledge manager configured to:
    determine the response for the at least one user query, wherein the response comprises a contextual response, an informative response, a generic response, or an actionable response;
    select a visual assistant for representing the response, wherein:
    the visual assistant is a virtual character configured to represent the response,
    the visual assistant is selected based on a unique identifier of the user or the user device,
    the visual assistant is selected in a real time manner or a pre-defined manner, and
    the communication unit is further configured to provide the response to the user device using the visual assistant, wherein the response is based on the at least one user query.

2. The virtual multimedia system of claim 1, further comprising a storage unit configured to:
    preconfigure a cache memory with of the visual assistant or the response, wherein the cache memory is located at the user device.

3. The virtual multimedia system of claim 2, wherein:
    the storage unit is further configured to:
    update the cache memory in an event the response is exhibited on the user device.

4. The virtual multimedia system of claim 1, wherein the knowledge manager, for determining the response, is further configured to:
    identify at least one intent from the at least one user query,
    determine at least one tag corresponding to the at least one intent, and
    process the at least one tag to determine at least one response to the at least one user query.

5. The virtual multimedia system of claim 1, wherein:
    the response is provided in a real time manner.

6. The virtual multimedia system of claim 1, wherein:
    providing the response comprises transmitting the response, using the visual assistant, to the interface.

7. The virtual multimedia system of claim 1, wherein:
    the virtual multimedia system comprises a chat bot, a video bot, a GIF bot, an audio bot, an advertisement bot, a meme bot, a virtual reality bot, a multi interface bot, or an educational bot.

8. The virtual multimedia system of claim 1, wherein:
    the at least one user query relates to at least one service required by the user of the user device.

9. The virtual multimedia system of claim 8, wherein:
    the at least one service comprises a troubleshooting, a diagnosis, a do-not-disturb, an entertainment, a buffering, a healthcare, or an education related service.

10. The virtual multimedia system of claim 1, wherein:
    the virtual multimedia contact is stored in a SIM of the user device, a memory of the user device, or at least one server.

11. The virtual multimedia system of claim 1, wherein:
    the virtual multimedia contact is pre-embedded in a SIM of the user device or installed in the user device from at least one server.

12. The virtual multimedia system of claim 1, wherein:
    the virtual multimedia contact comprises an image, a meme, a name, a unique contact number, or a text.

13. The virtual multimedia system of claim 1, wherein:
    the interface is the interface or a native application interface.

14. The virtual multimedia system of claim 1, wherein:
    the user command is an audio command, a text command, a touch input, or a dedicated key.

15. The virtual multimedia system of claim 14, wherein:
    the dedicated key is present in the interface; and
    the interface is a user device interface or a native application interface.

16. The virtual multimedia system of claim 1, wherein:
    the visual assistant is selected from cache memory or at least one server in an event the visual assistant is selected in the pre-defined manner.

17. The virtual multimedia system of claim 1, wherein:
    determining the response, further comprises
    identifying at least one intent from the at least one user query;
    determining at least one tag corresponding to the at least one intent; and
    processing the at least one tag to determine at least one response to the at least one user query.

18. A method in a virtual multimedia system providing a response to a user device based on at least one user query, wherein the virtual multimedia system comprises:
    a communication unit configured to receive the at least one user query through a virtual multimedia contact, wherein the at least one user query is received from a user of the user device, the at least one user query is a text query, an audio query or a video query, the at least one user query invokes the virtual multimedia system, and the virtual multimedia contact is invoked by receiving a user command from the user through an interface;
    the method comprising:
    with a knowledge manager:
    determining the response for the at least one user query, wherein the response comprises a contextual response, an informative response, a generic response, or an actionable response;

selecting a visual assistant for representing the response, wherein the visual assistant is a virtual character configured to represent the response;

the visual assistant is selected based on a unique identifier of the user or the user device;

the visual assistant is selected in a real time manner or a pre-defined manner; and the communication unit is further configured to provide the response to the user device using the visual assistant, wherein the response is based on the at least one user query.

\* \* \* \* \*